Figure 1:
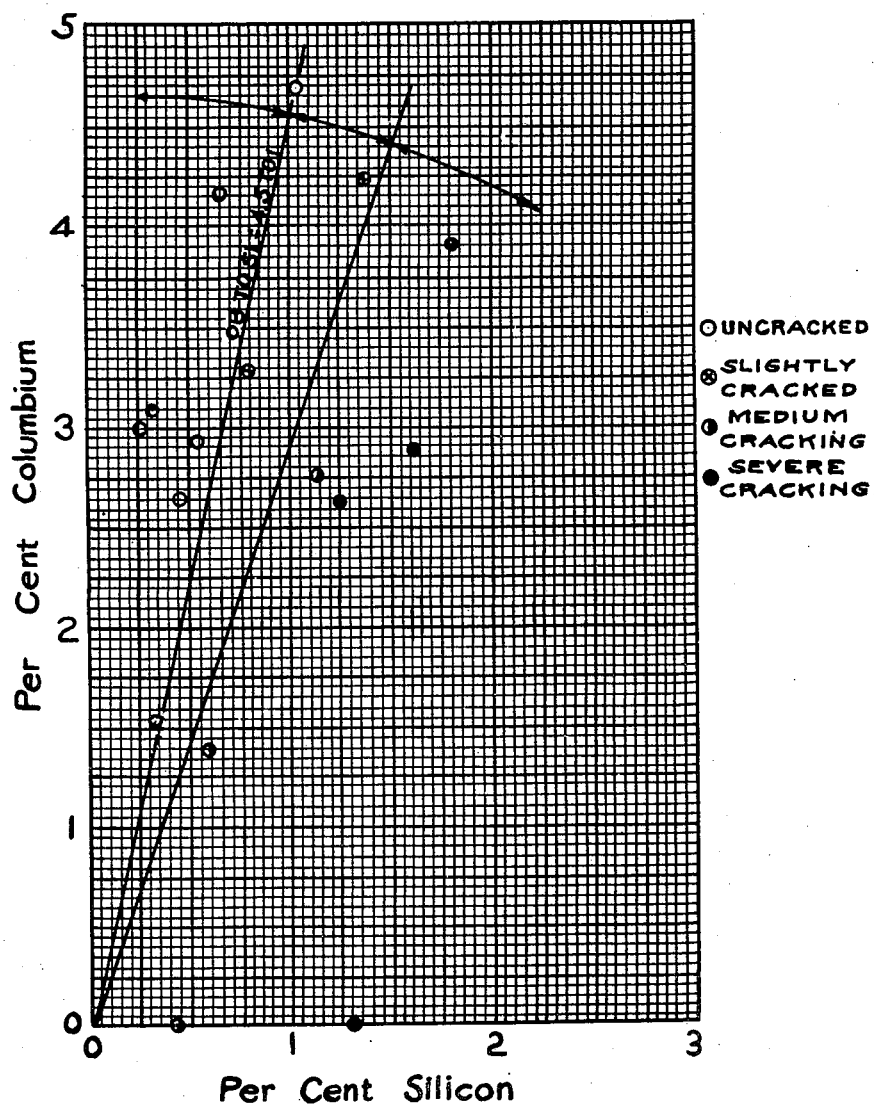

June 17, 1947.   T. E. KIHLGREN ET AL   2,422,489
WELDING ELECTRODE
Filed June 30, 1945    2 Sheets-Sheet 2

Fig.2.

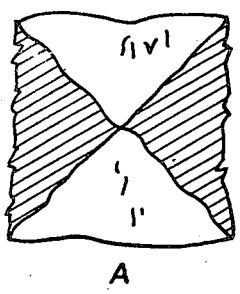

A $\dfrac{CB\ 0.\%}{Sl\ 0.42\%} = 0$

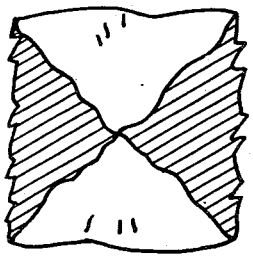

B $\dfrac{CB\ 1.40\%}{Sl\ 0.59\%} = 2.4\text{-}1$

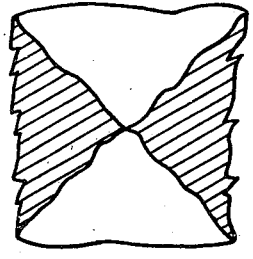

C $\dfrac{CB\ 2.65\%}{Sl\ 0.46\%} = 5.7\text{-}1$
ELECTRODE OF
PRESENT INVENTION

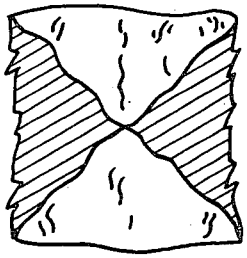

D $\dfrac{CB\ 2.89\%}{Sl\ 1.62\%} = 1.8\text{-}1$

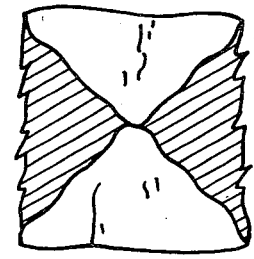

E $\dfrac{CB\ 2.63\%}{Sl\ 1.25\%} = 2.1\text{-}1$
PRIOR
ELECTRODE

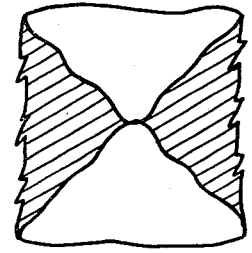

C $\dfrac{CB\ 2.65\%}{Sl\ 0.46\%} = 5.7\text{-}1$
ELECTRODE OF
PRESENT INVENTION

INVENTORS
THEODORE E. KIHLGREN
AND CHARLES E. LACY
BY
ATTORNEY

Patented June 17, 1947

2,422,489

UNITED STATES PATENT OFFICE 2,422,489

WELDING ELECTRODE

Theodore E. Kihlgren, Scotch Plains, and Charles E. Lacy, Westfield, N. J., assignors to The International Nickel Company, Inc., New York, N. Y., a corporation of Delaware Application June 30, 1945, Serial No. 602,498
In Canada June 2, 1945

5 Claims. (Cl. 219—8)

The present invention relates to a nickel alloy welding electrode and, more particularly, to a nickle alloy welding electrode operable on A. C. as well as D. C. welding machines and capable of producing ductile, single and multiple bead welds, essentially free of hot cracking tendencies.

Nickel base, nickel-chromium alloy welding electrodes and nickel base, nickel-chromium-iron alloy electrodes which have been known to the prior art all suffered from certain deficiencies or disadvantages which rendered their use difficult and in many cases unsatisfactory. For example, one or more of the following deficiencies was generally present:

1. Unsuitability for use in A. C. welding machines as well as on the conventional D. C. welding machines.
2. Inability to meet free bend requirements due to porosity and/or weld hot cracking tendencies.
3. Inability of commercial flux coated electrodes consistently to produce crack-free, multiple bead welds in heavy plate.

As an indication of prior art inadequacies in permitting crack-free welds to be obtained, the following widely varying flux coatings applied to 80 nickel - 14 chromium - 6 iron and 80 nickel - 20 chromium alloys were found quite unable to produce welds free of hot cracking tendencies. Some of the electrodes tabulated hereinafter were commercially produced electrodes and others were provided with experimental coatings of a type commonly encountered in electrode flux coatings.

(1)* Commercial electrode (80/14/6) cryolite, fluorspar, sodium fluoride, FeTi, silicate (2)* Commercial electrode (80/14/6) cryolite, feldspar, rutile, FeCb, NiTi, mordex, bentonite, silicate (3) $67CaF_2$, $14.4CaSiO_3$, $14.4CaCO_3$, 1.9 bentonite, 2.3 FeMn, $Na_2SiO_3$ binder (4) $35CaF_2$, 15NaF, $5SiO_2$, $45TiO_2$, $Na_2SiO_3$ binder (5) $35CaF_2$, 15NaF, $20SiO_2$, 30NiTi, dextrine binder (6) $21CaF_2$, 9NaF, $40SiO_2$, 30NiTi, dextrine binder (7) $20CaF_2$, $54CaCo_3$, 2 bentonite, $24Tio_2$, $Na_2SiO_3$ binder (8) $22CaF_2$, $17CaCO_3$, 5FeMn, $26TiO_2$, $30Na_2SiO_3$, dextrine binder (9) $21CaF_2$, $17CaCo_3$, 5FeMn, $40TiO_2$, $17Na_2SiO_3$, dextrine binder

(10) $30CaF_2$, $17CaCo_3$, 5FeMn, $45TiO_2$, $Na_2SiO_3$ binder

(11) $10CaF_2$, 21FeMn, $23K_2TiO_3$, $23CaTiO_3$, $23Na_2SiO_3$, dextrine binder

(12) $23CaF_2$, 23FeTi, $25CaCO_3$, $29K_2TiO_3$, dextrine binder

It will be noted from the foregoing tabulation of prior art flux coatings that a wide variety of lime type, rutile ($TiO_2$) type and sodium fluoride-fluorspar type fluxes modified with various minerals and metallic addition alloys have been used. These commonly used types of flux coatings were inadequate and it is apparent that the proper type of coating to produce the desired results required extended study and experimentation to evaluate the factors influencing weld hot ductility.

We have discovered that the hot cracking tendency in welds of the prior art is related to the silicon content of the fusion, the hot cracking tendency being greater the greater the amount of silicon present and that this deleterious effect of

---

* 1 and 2 are proprietary flux coatings—consisting essentially of the ingredients indicated.

the silicon in the fusion is substantially overcome by introducing columbium into the fusion in an amount sufficient to maintain in the fusion a columbium to silicon ratio in excess of a certain minimum value.

It is an object of the present invention to provide a welding electrode for use in welding nickel-chromium-iron alloys with either A. C. or D. C. welding equipment.

It is another object of the present invention to provide a welding electrode the use of which will substantially eliminate the tendency toward weld hot cracking in welds of nickel base, nickel-chromium alloys and nickel-chromium-iron alloys.

A further object of the present invention is the provision of a welding electrode containing columbium and silicon in such definite and predetermined relationship to each other that welds made therefrom will have columbium and silicon in the finished weld in a columbium-silicon ratio exceeding a certain minimum value.

It is a still further object of the present invention to produce welds capable of meeting free bend requirements.

The present invention also contemplates the provision of a flux coated welding rod in which the flux is devoid of components and binder materials which would have a tendency to react with essential residual elements of the weld and to eliminate such essential residual elements from the fusion, the said flux being also devoid of ingredients which would introduce such undesirable elements as lead and sulfur into the fusion.

Other objects and advantages will become apparent from the following disclosure:

Nickel-chromium-iron alloys such as those sold under the trade-mark "Inconel" generally contain small but highly important proportions of residual elements to insure hot and cold malleability, these residual elements also serving to "fix" such deleterious impurities as sulfur, for example, and to render such deleterious impurities comparatively harmless. The electrode of the present invention operates to avoid loss of these essential residual constituents, both by providing a protective atmosphere about the arc and by avoiding the use of flux components and binders which may react with these essential residual elements and eliminate the latter from the fusion. In addition, the use of flux ingredients which might introduce undesirable elements such as lead and sulfur into the fusion is also avoided. In addition to the aforesaid essential residual elements, these nickel-chromium-iron alloys generally contain silicon as an impurity and it is therefore impossible to obtain a nickel-chromium-iron alloy weld metal of zero silicon content since a small amount of silicon is always present, either in the alloy itself or in the flux ingredients. It has been found that silicon, whether added intentionally or inadvertently present, produces hot cracking in nickel-chromium-iron alloy welds, the severity of the cracking increasing with the silicon content. Silicon cannot be wholly eliminated from the fusion and for practical purposes cannot generally be reduced below about 0.15%. The present invention provides a means whereby the inherent tendency of silicon to promote hot cracking is substantially eliminated. It has been found that the addition of columbium to the fusion tends to counteract the deleterious effect of the silicon and that by the provision of a sufficient columbium to silicon ratio in the weld metal, the hot cracking tendency of nickel base, nickel-chromium alloys and nickel base, nickel-chromium-iron alloys can be completely eliminated. A direct relationship has been found to exist between the columbian content that must be present in the weld metal and the silicon content in the weld metal in order to counteract the deleterious effect of the silicon. The minimum columbium to silicon ratio necessary in the weld metal to eliminate hot cracking in alloys of the "Inconel" type is 4.5–1, but in practice it has been found that this ratio should be maintained at from 5 or 6 to 1 in order to provide a margin of safety. A ratio of columbium to silicon as high as 12:1 has given satisfactory results. For reasons of economy and desirability of minimum deviation from the base metal composition, however, it is preferred that the columbium content should not exceed 5.0%. Since it is desirable, for reasons of economy, to maintain the columbium content of the weld metal as low as possible, it will be apparent that this requires that the silicon content also be maintained as low as possible in order to maintain the preferred columbium-silicon ratio. The preferred ratio is maintained by introducing columbium into the fusion while at the same time avoiding or minimizing the use of flux ingredients which would introduce silicon into the fusion. It will be apparent from the foregoing that the amount of columbium which is introduced into the weld metal will be determined by the minimum silicon content which can be practically obtained in the fusion. As stated hereinbefore, it is generally impossible to reduce the silicon content below 0.15% and it will be apparent that the minimum columbium content will generally be from about 0.675% to about 0.90% in order to maintain the preferred columbium-silicon ratio. In the preferred embodiment of the present invention, the columbium is introduced into the fusion entirely through the flux coating on the electrode core wire. A convenient means for introducing the columbium into the flux coating is by the addition of appropriate amounts of ferro-columbium. Columbium may be introduced, however, partly through the flux coating and partly through the core wire, or it may be introduced through the core wire alone.

Columbium has previously been used in a flux coating for electrodes of the prior art as will be seen in Example 2 of the listing of prior art flux coatings given hereinbefore. Columbium was added to this electrode for the purpose of preventing intergranular stress corrosion of the weld metal. This prior art electrode flux coating, however, also introduced a considerable amount of silicon into the fusion and the low columbium to silicon ratio (2.1–1) was not sufficiently great to prevent weld hot cracking. The results of comparative tests between this prior art electrode and the electrode of the present invention are given hereinafter.

The electrode of the present invention, in addition to maintaining a columbium to silicon ratio within preferred limits in the weld deposit, also provides ingredients in the flux coating which make possible its operation on A. C. as well as D. C. welding machines. In the present flux, calcium carbonate is the essential ingredient for producing good A. C. arc behavior since it has been found that alkali earth metal oxides or alkali earth compounds which decompose to oxides will stabilize the A. C. arc. The composition of such a flux coating is as follows:

| Flux Coating | Preferred, Per Cent | Range, Per Cent |
|---|---|---|
| Dry ingredients: | | |
| Calcium carbonate [1] | 42.0 | 37–47 |
| Calcium fluoride [1] | 25.0 | 20–30 |
| Ferro-25% titanium [2] | 10.0 | 5–20 |
| Ferro-50% columbium [3] | 20.0 | [3] 0–30 |
| Bentonite (hydrated aluminum silicate) | 3.0 | 2–5 |
| | 100.0 | |
| Binder: | | |
| Dextrine [4] (per cent by weight of dry ingredients) | 3.0 | 1–5 |

[1] As low in SiO₂ as can be obtained in commercial grades.
[2] As low in Si as can be obtained in commercial grades.
[3] With 0% in the coating, columbium would be introduced solely through the core wire.
[4] Potato dextrine is preferably used, mixed with water at 160°–212° F. in a dextrine-water ratio of about 1:3 (by weight).

In preparing the flux coating from the foregoing dry ingredients and binder, the dextrine-water mixture is added to the mixture of dry ingredients to obtain a consistency suitable for extrusion with the core wire. Although it is preferred to use potato dextrine as the binder, other types of dextrine binders may be used. Colloidal clays other than bentonite may also be used.

Core wire

The coating described is applied to a core wire, having about the following composition range: 0.01–0.2 C, 0.05–1.0 Mn, 4–10 Fe, 0.05–0.7 Si, 0.05–1.0 Cu, 75–85 Ni, and 10–16 Cr. The coating is preferably applied to a commercial production wire such as that sold under the trade-mark "Inconel," the composition of which falls within the foregoing range. Such a core wire may be further modified by the addition of other elements such as aluminum, titanium and molybdenum. As stated hereinbefore, the columbium content necessary to obtain the required columbium to silicon ratio in the weld metal may be introduced partly or wholly through the core wire; therefore the above core wire composition may be modified to contain from 0 to 5% columbium. The coating has also been successfully applied to an 80 nickel-20 chromium wire of suitably low silicon content as is shown by "X weld" tests given hereinafter.

The columbium to silicon ratio was established by making a series of "X weld crack tests" with varying contents of columbium and silicon. The "X weld crack test" is made by forming a weld in which two 3-inch lengths of 1 inch square bar stock are joined with a double V groove-weld. The weld passes were laid in, two at a time, on alternate sides of the double V with sufficient time lapse between each pair of passes to permit the specimen to cool to below 100° F. During welding, visual examination is made of each pass after it has been laid in to determine whether any gross cracking has occurred. After welding, the specimen is sectioned twice on planes perpendicular to the direction of welding and the subsectional surfaces of the weld are polished on a rubber bonded fine abrasive wheel, etched, and examined under a binocular microscope for cracks.

In order to give those skilled in the art a more complete understanding of the present invention, reference is made to the accompanying drawings in which:

Fig. 1 is a graphical representation of the extent of cracking present in welds of varying columbium-silicon ratios; and Fig. 2 illustrates how hot cracking in welds decreases with an increase in the columbium-silicon ratio.

Sixteen "X weld crack tests" having different columbium and silicon contents were prepared and examined for cracking in the manner described in the foregoing procedure and were analyzed for columbium and silicon. The extent of cracking in these welds, classified as "uncracked," "slightly cracked," "medium cracking" and "severe cracking," from the observation of the crack test specimens, was indicated by the type of point on the columbium vs. silicon graph of Fig. 1. The columbium to silicon relationship was determined from this graph. In tabulated form the data concerning these sixteen X-welds with the columbium-silicon ratios were as follows:

Table 1

| Weld No. | Columbium content, per cent | Silicon content, per cent | Cb-Si Ratio | Observation of cracking in the sectioned welds. |
|---|---|---|---|---|
| 1 | 0 | 1.39 | 0–1.39 | Severe. |
| 2 | 2.89 | 1.62 | 1.78–1 | Do. |
| 3 | 2.63 | 1.25 | 2.10–1 | Do. |
| 4 | 0 | 0.42 | 0–.42 | Medium. |
| 5 | 3.91 | 1.80 | 2.17–1 | Do. |
| 6 | 1.40 | 0.59 | 2.37–1 | Do. |
| 7 | 2.75 | 1.14 | 2.41–1 | Do. |
| 8 | 4.24 | 1.37 | 3.09–1 | Slight. |
| 9 | 3.29 | 0.80 | 4.11–1 | Do. |
| 10 | 4.70 | 1.04 | 4.52–1 | None. |
| 11 | 1.54 | 0.31 | 4.97–1 | Do. |
| 12 | 2.94 | 0.55 | 5.34–1 | Do. |
| 13 | 2.65 | 0.46 | 5.77–1 | Do. |
| 14 | 4.16 | 0.66 | 6.30–1 | Do. |
| 15 | 3.09 | 0.33 | 9.36–1 | Do. |
| 16 | 3.00 | 0.26 | 11.53–1 | Do. |

The columbium content and silicon content as shown for each of the welds in the foregoing table were determined by analyses of the completed weld in each instance. The progressively favorable results that are obtained as the columbium-silicon ratio in the weld is brought to and beyond 4.5 to 1 in accordance with the present invention is clearly demonstrated in the foregoing table. It will be noted from the data of the foregoing tabulation that no cracking occurred in the "X weld crack tests" when the ratio of columbium to silicon was in excess of 4.5 to 1, but that cracking occurred, varying from slight to severe, when that ratio fell to 4.11 to 1 or lower.

Five "X weld crack tests" were chosen from the sixteen "X weld crack tests" previously described to further demonstrate how weld hot cracking decreases with an increase in the columbium-silicon ratio and the results of these five tests are shown diagrammatically in Fig. 2. The beneficial effects are shown in A, B and C of Fig. 2 when the increase in the columbium-silicon ratio is obtained by increasing the columbium content while maintaining the silicon content substantially constant and similar results are shown in D, E and C wherein the columbium-silicon ratio is increased by decreasing the silicon content while maintaining the columbium content substantially constant. It will be noted that C represents the electrode of the present invention in both instances.

It has already been noted that Example 2 in the history of the prior art flux coatings shows the use of columbium, but that the columbium-silicon ratio (2.1–1) was not sufficiently great to prevent weld hot cracking. Diagram E of Fig. 2 represents an "X weld crack test" in which this prior art flux coating was used. It will be noted in that diagram that some cracking has occurred and this is due to the low columbium-silicon ratio.

Additional data on these five "X welds" shown in Fig. 2 are given in the following table:

binder. The plates were welded at 120 amperes D. C. in five passes with one sealing bead on the

Table 2

| Core Wire, Flux and Weld Data | 1-A | 2-B | 3-C | 4-D | 5-E |
|---|---|---|---|---|---|
| "Inconel" Core Wire | Used | | Used | Used | Used. |
| "Inconel" Core Wire, 2% Cb added | | Used | | | |
| Core Wire diameter .156" | Used | do | Used | Used | Do. |
| Coated electrode, outside diameter .230" | do | do | do | do | |
| Coated electrode, outside diameter .200" | | | | | Do. |
| Current used, type and amperes | 120 amp. D. C. | 120 amp. D. C. | 120 amp. D. C. | 120 amp. D. C. | 120 amp. D. C. |
| Flux Composition: | | | | | |
| $CaCO_3$ | 46.0% | 46.0% | 41.0% | 37.0% | |
| $CaF_2$ | 25.0% | 25.0% | 25.0% | 23.0% | |
| FeTi | 25.0% | 25.0% | 10.0% | 9.0% | |
| FeCb | | | 20.0% | 18.0% | Used. |
| FeSi | | | | 9.0% | |
| Cryolite | | | | | Do. |
| Feldspar | | | | | Do. |
| Rutile | | | | | Do. |
| SiTi | | | | | Do. |
| Bentonite | 4.0% | 4.0% | 4.0% | 4.0% | Do. |
| Flux Binder: | | | | | |
| Potato dextrine | 1.0% | 1.0% | 1.0% | 1.0% | |
| Silicate | | | | | Do. |
| Cb/Si ratio in weld metal | 0-.42 | 2.4-1 | 5.7-1 | 1.8-1 | 2.1-1. |
| Hot cracks observed in sections | Yes | Yes | None | Yes | Yes. |

It will be noted from the results given in the foregoing tables that when welds are made without adding columbium to the fusion in the columbium-silicon ratio of the present invention, cracking is observed in the finished sections as is shown in Example 1A. When the columbium-silicon ratio is increased, as shown in Example 2B, the appearance of hot cracking is decreased but, at the Cb-Si ratio used, is not wholly eliminated. When the columbium ratio is further increased as in Example 3C, it will be noted that no hot cracking is observed in the finished sections. In contrast, when the columbium-silicon ratio is decreased, cracks in the finished section are observed, as will be seen in the results given for Examples 4D and 5E, the amount of cracking being somewhat less in 5E than in 4D. As stated heretofore, the weld under 5E was made using a commercial prior art coated electrode No. 2 in the list of prior art electrode flux coatings.

Example 1

An "X weld crack test" was made using an "Inconel" core wire of ⅛" diameter having a flux coating thereon comprising 42% $CaCO_3$, 25.5% $CaF_2$, 10% FeTi, 20% FeCb and 2.5% bentonite with 3% of dextrine binder. The coated electrode was .190" outside diameter and was used in making an "X weld" using 105 amperes A. C. No cracks were observed in the sections. The columbium and silicon in this weld were approximately 3% and 0.3%, respectively.

Tests of the mechanical properties of welds produced according to the present invention were also made and the results are shown in the following examples:

Example 2

Two ⅜" x 5" x 10" plates of 80 nickel-14 chromium-6 iron alloy were butt welded to give a welded plate of ⅜" x 10" x 10". The electrode used was a commercial "Inconel" core wire of 3/32" diameter, extruded with a flux coating to an outside diameter of .230". The flux coating was made up of 42% $CaCO_3$, 25.5% $CaF_2$, 10% FeTi, 20% FeCb and 2.5% bentonite with a dextrine binder. The plates were welded at 120 amperes D. C. in five passes with one sealing bead on the reverse side. The welded plate was tested as follows:

Bend tests:
 Face bend 24% elongation without failure.
 Root bend 35% elongation without failure.
Tensile tests (short gauge specimens):
 Tensile strength 1—97,000 p. s. i.
 Tensile strength 2—91,000 p. s. i.

Example 3

Two ⅜" x 4" x 6" plates of 80 nickel-14 chromium-6 iron alloy were butt welded to give a ⅜" x 8" x 6" welded plate. The electrode used was the same as that used in Example 2 with the same core wire and the same flux coating. The plates were welded at 120 amperes D. C. in five passes with one sealing bead on the reverse side. The welded plate was tested as follows:

Bend tests:
 Face bends 37.5% elongation with no failure.
 Root bends 51% elongation with no failure.

Example 4

Two ⅜" x 5" x 10" plates of an 80 nickel-14 chromium-6 iron alloy were butt welded to give a ⅜" x 10" x 10" welded plate. The electrode used was a core wire of 80 nickel-14 chromium-6 iron of commercial grade, 3/32" diameter extruded with a flux coating to an outside diameter of 0.230". The flux coating composition was 42.0% $CaCO_3$, 25.0% $CaF_2$, 10.0% FeTi, 20.0% FeCb and 3.0% bentonite with a dextrine binder. The plates were welded at 145 amperes A. C. in seven passes against an "Inconel" back-up strip. The welded plate was tested as follows:

Bend tests:
 Face bend 35% elongation.
 Root bend 34% elongation.
Tensile tests (short gauge specimens):
 Tensile strength 1—93,000 p. s. i.
 Tensile strength 2—95,300 p. s. i.

The foregoing data is illustrative of the mechanical properties of welds made in accordance with the present invention when alternating current is used.

Example 5

| X Weld Number | 1 | 2 |
| --- | --- | --- |
| Core wire—80Ni-20Cr | Used | Used. |
| Core wire diameter | 0.156" | 0.156". |
| Coated electrode, outside diameter | 0.230" | 0.230". |
| Current used, type and amperes | 120 amps. D. C. | 120 amps. D. C. |
| Per cent silicon in core wire | 0.16 | 1.30. |
| Flux Composition: | | |
| $CaCO_3$ | 42.0% | 42.0%. |
| $CaF_2$ | 25.0% | 25.0%. |
| FeTi | 10.0% | 10.0%. |
| FeCb | 20.0% | 20.0%. |
| Bentonite | 3.0% | 3.0%. |
| Dextrine binder | 3.0% | 3.0%. |
| Cb-Si ratio in weld metal | 6.5–1 | 2.19–1. |
| Hot cracks observed in sections | No | Yes. |

The foregoing data demonstrates that the methods and beneficial results of the present invention are equally applicable to nickel-chromium alloys such as those of the 80/20 type.

Thus, although the present invention generally has been described in conjunction with a preferred embodiment in which columbium is added to a nickel-chromium-iron alloy core wire such as that sold under the trade-mark "Inconel" or is incorporated in the flux coating for such an alloy wire, the procedure of a controlled columbium to silicon ratio to prevent hot cracking in accordance with the present invention is adaptable to other high nickel alloys and to nickel-chromium-iron alloys other than those sold under the trade-mark "Inconel" and containing considerable quantities of nickel. Thus, by varying the columbium-silicon ratio in accordance with the present invention, welds of all such alloys, free from weld hot cracks, may be made.

We claim:

1. An electric arc welding electrode adapted for forming weld deposits substantially devoid of hot cracks comprising a core wire containing about 75% to 85% nickel, about 10 to 16% chromium, about 4% to 10% iron and at least 0.15% silicon together with minor proportions of other alloying elements and a flux coating enclosing said core wire, said flux coating containing columbium in such quantities and in such form that the residual columbium content in said weld deposit will be about six times the residual content of silicon in said deposit.

2. An electric arc welding electrode adapted for forming weld deposits substantially devoid of hot cracks comprising a core wire containing about 75% to 85% nickel, about 10% to 16% chromium, about 4% to 10% iron and at least 0.15% silicon together with minor proportions of other alloying elements and a flux coating enclosing said core wire, said flux coating containing columbium in such quantities and in such form that the residual columbium content in said weld deposit will be at least four and one-half times the residual content of silicon in said deposit.

3. An electric arc welding electrode adapted for forming weld deposits substantially devoid of hot cracks comprising a core wire containing at least 75% nickel, 10% chromium and minor proportions of silicon and a flux coating enclosing said core wire, said electrode containing columbium in such quantities that the residual columbium content in said weld deposit will be at least four and one-half times the residual content of silicon in said deposit.

4. An electric arc welding electrode adapted for forming weld deposits substantially devoid of hot cracks comprising a core wire containing about 80% nickel and about 20% chromium but including a minor proportion of silicon and a flux coating enclosing said core wire, said flux coating containing columbium in such quantities and in such form that the residual columbium content in said weld deposit will be about six times the residual content of silicon in said deposit.

5. An electric arc welding electrode adapted for forming weld deposits substantially devoid of hot cracks comprising a core wire containing about 80% nickel and about 20% chromium but including a minor proportion of silicon and a flux coating enclosing said core wire, said flux coating containing columbium in such quantities and in such form that the residual columbium content in said weld deposit will be at least four and one-half times the residual content of silicon in said deposit.

THEODORE E. KIHLGREN.
CHARLES E. LACY.

REFERENCES CITED

The following references are of record in the file of this patent:

UNITED STATES PATENTS

| Number | Name | Date |
| --- | --- | --- |
| 1,954,296 | Keir (1) | Apr. 10, 1934 |
| 1,954,297 | Keir (2) | Apr. 10, 1934 |
| 2,306,421 | Arness | Dec. 29, 1942 |